United States Patent [19]
Olson

[11] Patent Number: 5,210,830
[45] Date of Patent: May 11, 1993

[54] DYNAMIC RECONFIGURATION OF UART POLLING LOOP WITH A JUMP TABLE

[75] Inventor: Gene H. Olson, Minneapolis, Minn.

[73] Assignee: Digi International, Inc., St. Louis Park, Minn.

[21] Appl. No.: 579,895

[22] Filed: Sep. 4, 1990

[51] Int. Cl.[5] .............................................. G06F 13/00
[52] U.S. Cl. ...................................... 395/325; 395/275
[58] Field of Search ................. 364/200, 900; 395/325, 395/275

[56] References Cited

U.S. PATENT DOCUMENTS

| | | | |
|---|---|---|---|
| 4,017,835 | 4/1977 | Randolph | 340/152 R |
| 4,325,147 | 4/1982 | Rothlauf | 370/91 |
| 4,599,647 | 7/1986 | George et al. | 358/122 |
| 4,677,612 | 6/1987 | Olson et al. | 370/85 |
| 4,683,531 | 7/1987 | Kelch et al. | 364/200 |
| 4,823,312 | 4/1989 | Michael et al. | 364/900 |
| 4,829,297 | 5/1989 | Ilg | 340/825.08 |

Primary Examiner—Robert L. Richardson
Attorney, Agent, or Firm—Faegre & Benson

[57] ABSTRACT

A method of dynamically reconfiguring a UART polling loop with a jump table.

23 Claims, 4 Drawing Sheets

DYNAMIC RECONFIGURATION OF UART POLLING LOOP WITH A JUMP TABLE

BACKGROUND OF THE INVENTION

1. Field of the Invention

This invention relates to the handling of data in computer systems employing a plurality of UARTs (an acronym for Universal Asynchronous Receiver-Transmitter devices) and in particular to a technique of using a jump table to dynamically reconfigure the UART polling loop of the multiport communications processor.

2. Description of the Prior Art

In computer systems there are a variety of communications arrangements which involve the handling of large amounts of data using multiple UARTs. When the UARTs in a system are accessed in sequence with a conventional polling loop, the throughput of the system is often reduced by the time spent executing instructions calling for operations unnecessary to at least some of the UARTs based upon their operating condition at the time that they are polled.

The communications functions of multiple UART communications assemblies are discussed below.

Receiving data

UARTs generally receive data one character at a time. Since the source of the data is typically another UART, a character is transmitted about every ten bit times, unless the UART is overloaded. Thus at 9600 baud some 960 characters per second are received by the UART if full speed operation is occurring. The receiving UART cannot control the speed of the transmitting UART other than to signal it to stop transmission completely. Even when such a signal is transmitted, a dozen or more additional characters may be transmitted before the stop is complete. These characters would be lost if the transmission were not stopped until overload occurred.

Because inexpensive UARTs are generally capable of holding between one and three characters in their receive buffers, the program servicing them must recover the characters from them fast enough so that they are not overwritten by an uncontrollable blast of receive data. If the characters are delivered at 960 characters per second, and the receiving UART only has a receive buffer for a single character, the program must service the UART once every 1/960 th of a second, or about once per millisecond. Thus a received character requires a response time of one millisecond. If a longer response time is provided by the receiving system, lost data will be inevitable.

If UARTs having receive buffers capable of storing three characters are used, a response time of 3 milliseconds can be tolerated without the loss of data. Increase in UART storage capacity substantially increases their cost.

Transmitting data

As was the case with the receiving data functional considerations discussed above, UARTs transmit data a character at a time. If the program controlling the transmission of data finds the transmit buffer empty, a character will be dropped into it. The UART begins to transmit that character and signals that the buffer is empty. If the program continues to fill the buffer rapidly enough, the UART will continue to transmit at full speed. If the program does not refill at full speed, the transmitting UART will not lose data but the transmission rate will be slower.

The response time required for the transmission of data full speed at 9600 baud is about the same one millisecond figure which is characteristic of the receive function. Slower response times reduce throughput. When a processor becomes overloaded and cannot handle all servicing requirements full speed, it can simply reduce transmit servicing and allow its throughput rate to "gracefully degrade". Thus most prior art systems give the servicing of receive data priority over data transmission.

Modem Signal Control

Most connections to external devices use some or all of the standard modem signals RTS, CTS, DSR, DCD,OCD, DTR, and RI. Of these signals, the communications processor provides RTS and DTR and accepts the other signals as inputs. Generally, these signals change much less quickly than data is transmitted and received. In well designed systems, this function requires very low overhead.

Break Handling

An asynchronous BREAK signal is a high going data line for longer than a character time. A short break could be for as short a time as ten bit times (no character is high for more than nine bit times). It could also be any longer time such as a full day. It is generally about 250 milliseconds long.

To send a BREAK, a processor sets a special bit in the UART which causes the processor to drive the transmit data line high until the processor resets the bit. Hence if the bit is high for 250 milliseconds, the processor sends a 250 millisecond break. This activity requires a timer to be present somewhere. This function is generally low overhead, but must be synchronized with transmission of data.

Received BREAK signals are usually handled much like received data. They vary in length, but very short breaks require response time as much as the received characters, and generally involve more processing.

Flow Control

Two types of flow control are generally supported: software and hardware. Software flow control is performed by sending and receiving XON/XOFF characters respectively to restart/stop transmission. Hardware flow control generally raises/lowers one or more modem signals to start/stop transmission.

These activities, while less critical than the receipt of individual characters, still require fast response time. Some terminals such as the popular VT100 require the RECEIVE to stop within 16 characters after sending an XOFF sequence. At high baud rates, this means a response time of about 4 msec. Although most modem signal detection is not time critical, when used for flow control, the response time requirements rise substantially.

From the above discussions of the various communications processor functions it should be evident that the most critical functions a multiport communications processor must provide are the transmission and receiving of data.

In order to provide the above functions, most communications processors use common approaches to optimize their operation as discussed below.

Transmit/Receive Interrupt Mode

In this prior art approach, the processor runs in an idle loop, or performs low priority processing with interrupts enabled. When a UART detects an incoming character or becomes empty so that it may accept another character it requests an interrupt. The program takes the interrupt, processes the data, re-arms the interrupt and continues as before.

This technique provides high speed, high response time servicing of of UARTS until the processor becomes overloaded. Overloading occurs rather quickly because saving and restoring processor context on a per-character basis is prohibitively expensive.

Transmit/Receive Poling Mode

The main loop of the program spins continuously through a UART servicing loop, looking for UARTs ready to receive a character or ready to transmit another one. Sometimes there are interrupt routines used to service received characters in error, to detect modem change signals, or to service a timer.

This technique provides high throughput provided most of the UARTs are active. When only a few UARTs are active the main loop spends a great deal of its time looking at inactive UARTs, with a consequent reduction in throughput compared to the interrupt method.

Transmit Polling/Receive Interrupt Mode

With this technique, UARTs are constantly polled for transmit, and interrupts are used for receive characters. Since interrupts are higher priority, receive characters are given priority over transmit. This is very appealing since received data is lost unless handled in a timely fashion.

Since the receive servicing is not in the transmit polling loop, the transmit polling loop runs faster, and transmit only throughput is superior to the previous techniques. Receive throughput is comparable to the first technique.

Modem signal handling can be done with modem change interrupts or with polling. Under normal circumstances modem interrupts are lowest overhead because the signals seldom change. However when users leave modem lines floating, capacitive effects may cause stray transmissions at the bit rate, creating an avalanche of meaningless interrupts. Polling routines limit modem changes to the polling rate and are therefore not susceptable to this problem.

SUMMARY OF THE INVENTION

The present invention achieves an optimization of the operation of an intelligent multi-port communications processor for a computer by dynamically reconfiguring the UART polling loop with at least one jump table.

The present invention uses two jump tables to configure the polling loop.

Figure 4:
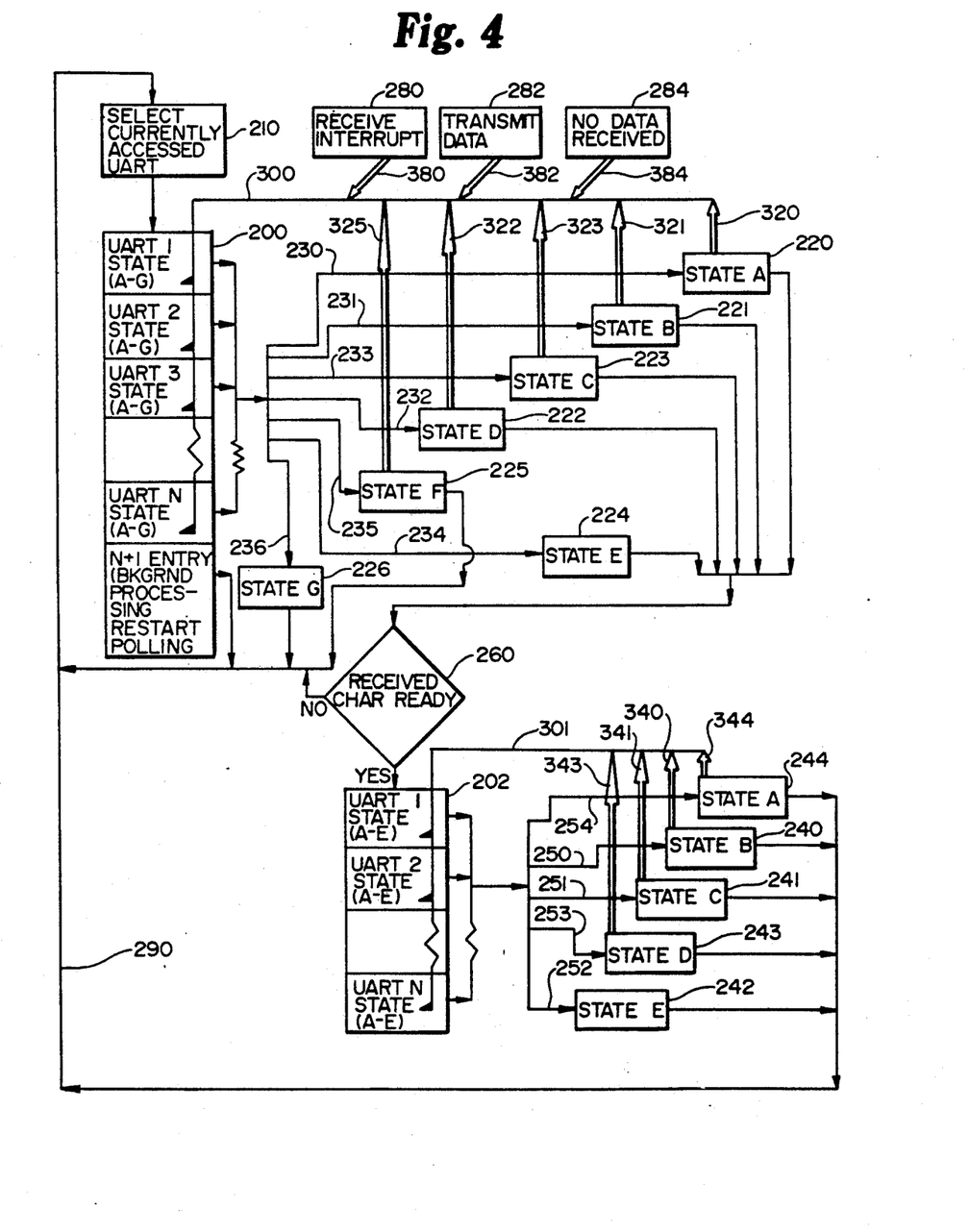
FIG. 4 is a conceptual diagram of the organization of a UART polling loop with the first and second jump tables represented in table format in accordance with the present invention.

As represented in FIG. 4, the reconfiguration technique senses which UARTs are active in either receive or transmit mode, and updates the first jump table 200, as indicated by update line 300 and related arrows 320-325, 380-384, to service only and updates those active functions. For example in a system with four UARTs, the first UART might be actively transmitting, the second UART receiving, the third UART engaged in bidirectional transmission and the fourth UART idle. In this example the first jump table is automatically and dynamically configured so the first UART would be polled for transmission only (indicated by box 225 and path 235), the second would be polled for receive only (indicated by box 224 and path 234), and the third UART would be polled for both transmit and receive (indicated by boxes 220-223 and paths 230-233). The fourth UART would not be polled at all, as indicated by path 236.

The present implementation activates the transmit polling loop in a background routine 282 when transmit data appears from the host, and deactivates it in the polling loop when all of the characters have been transmitted, as indicated by update in 300 and related arrows 320-325. The receive polling loop is activated by the receive interrupt routine 280 when a receive character appears, and is deactivated by a background routine 284 when no data has appeared for a timeout period.

As a further optimization, when the transmitter is active the first jump table 200 references the subfunction 220-223 of the transmit routine that is needed next. For example, if an XON/XOFF character must be sent next, the first jump table points directly to a routine to do just that. However if the RAW output data must be sent next, the first jump table instead points to a RAW data output routine.

A second jump table 202 similarly controls the receive polling loop and is accessed each time a UART character is received. This second jump table 202 references a routine 240-244 optimized to handle the immediate receive state. For example if the XON/XOFF flow control characters are active, the jump table points directly to a routine that checks for XON/XOFF characters. If XON/XOFF is not active, the jump table points instead to a different routine without that check.

DETAILED DESCRIPTION OF THE PREFERRED EMBODIMENTS

Figure 1:
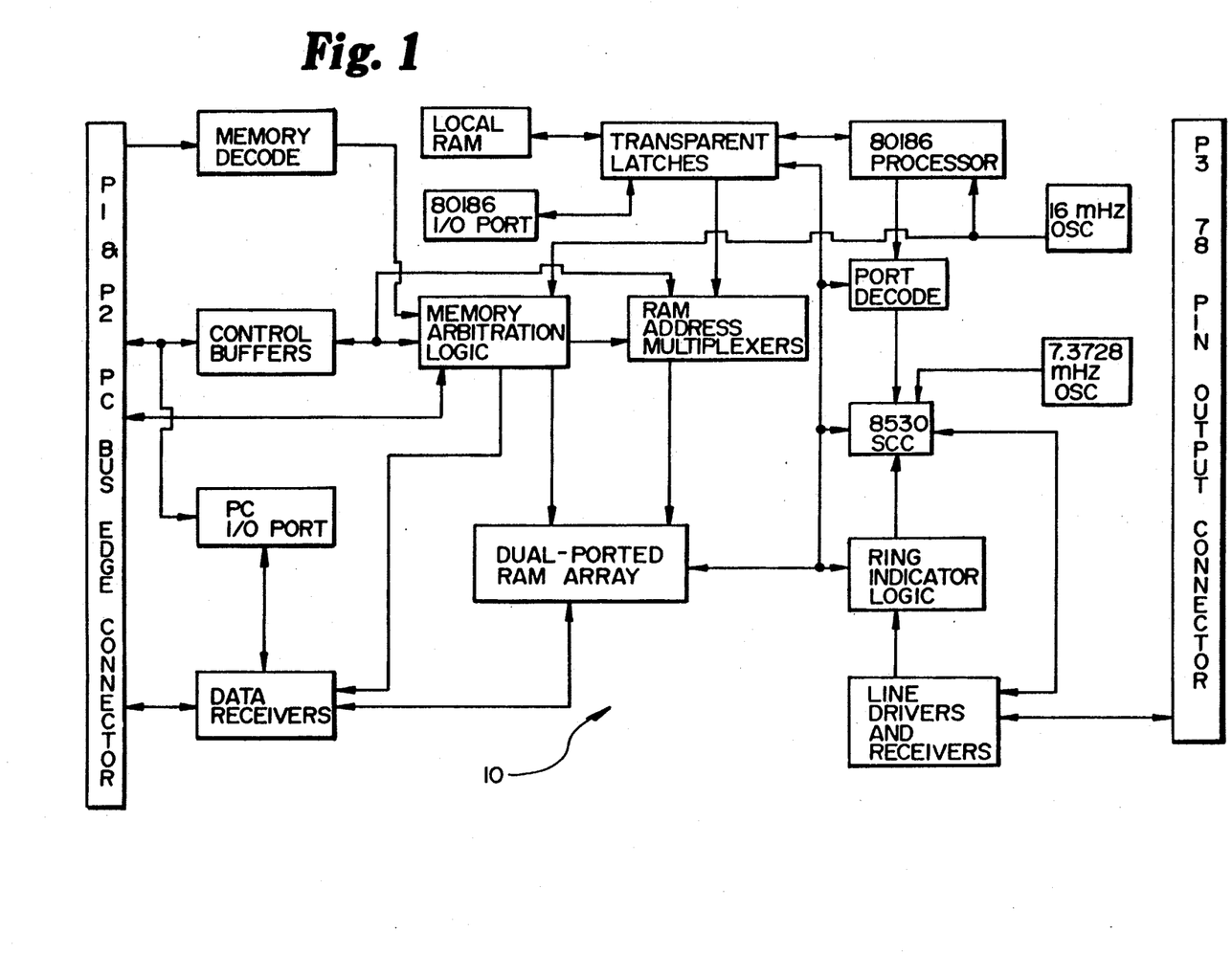
FIG. 1 is a functional block diagram of a communications processor in which the present invention may be used.

FIG. 1 is a block diagram of a multi-channel communications processing apparatus 10. In a possible embodiment of the system, the communications system may take the form of a communications processor for connection into the bus of a microcomputer system such as a PC/AT. The communications processing apparatus 10 is actually a computer which allows for a dedicated CPU to handle the I/O control for enhanced system performance, much like a front end processor functions in connection with a mainframe host.

Figure 2:
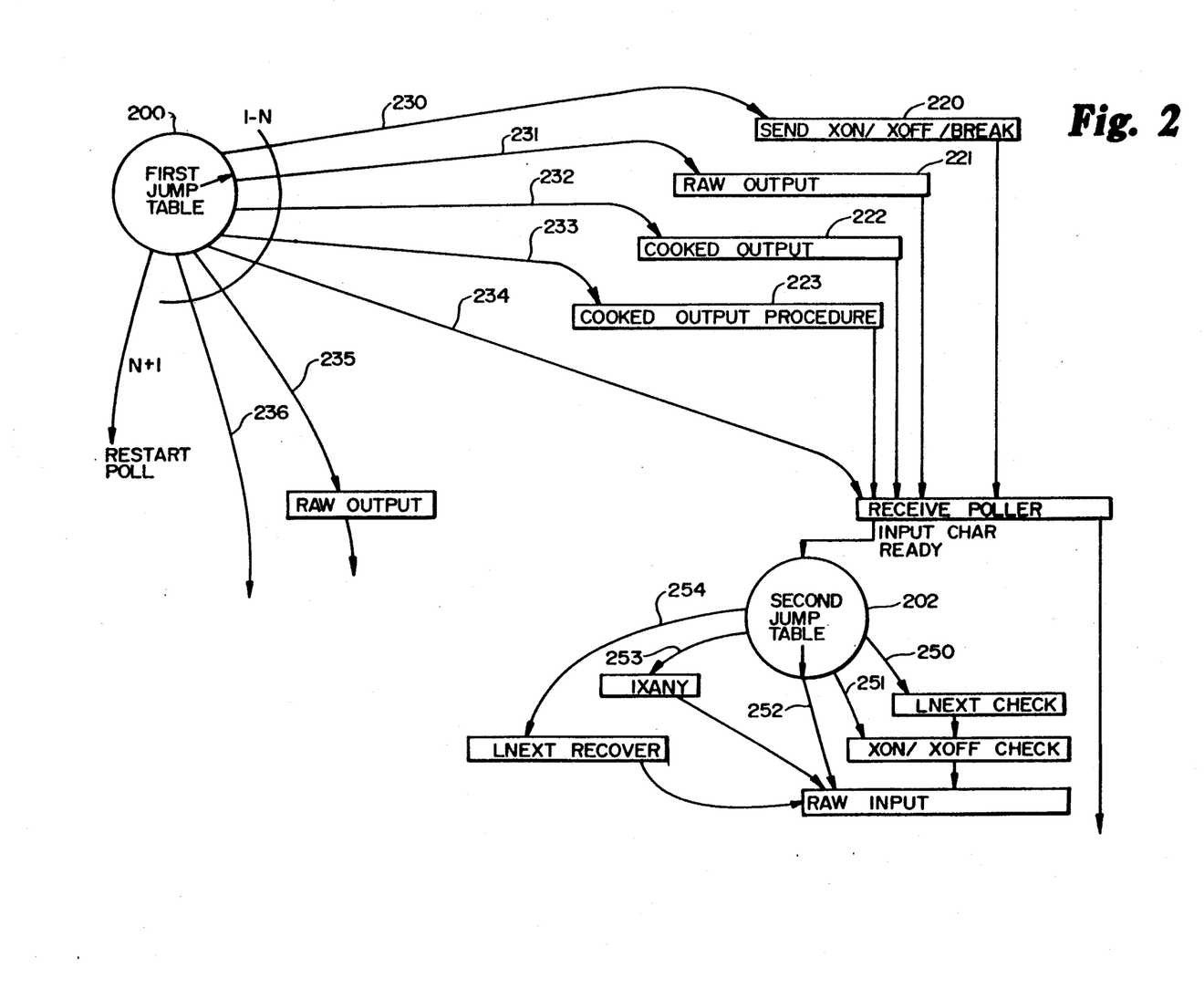
FIG. 2 is a conceptual diagram of the organization of a UART polling loop in accordance with the present invention.

FIG. 2 and FIG. 4 illustrate the organization of the jump tables used to reconfigure the UART polling loop of a communications processor in accordance with the present invention. The first jump table 200 is shown in FIG. 4 as a table with separate entries for each of the UARTs in the system, and is shown in FIG. 2 conceptually as a rotary switch which can be rotated to select the operations that are to be performed on each of the UARTs in the system when that UART is accessed (at box 210) by the polling loop. In prior art systems it is necessary that each of the operations illustrated in FIG. 2 and FIG. 4 be run for each UART each time it is polled thereby resulting in a high system overhead particularly where the system has a minimal number of UARTs actively engaged in transmitting or receiving raw data.

In the present system, the operations to be performed on an accessed UART are initially determined by the condition of the accessed UART (i.e. inactive, receive active, receive and transmit active, transmit active). In addition to selecting operations from a first jump table in accordance with the status of the UARTs, the arrangement of FIG. 2 and FIG. 4 utilizes a second jump table 202 (also illustrated conceptually as a rotary switch in FIG. 2 and a table in FIG. 4) to reference the next function to be performed by the receive routine upon receipt of a valid received character at box 260 of FIG. 4.

Using the prior art polling arrangements, each UART in the loop normally receives an exhaustive sequence of tests each time that it is polled. The tests can be described in pseudo-code as follows:

```
if (XON/XOFF required)
    if (UART ready)
        transmit XON/XOFF character
else if (BREAK requested)
    if (All characters clear of transmit
            UART)
        start BREAK
        set BREAK timer
        Note BREAK in progress.
    else if (BREAK in progress)
        if (BREAK timer complete)
            stop BREAK
            Note BREAK no longer in progress.
    else if (No data to send)
        Processing Complete
    else if (in RAW mode)
        if (UART ready)
            output the next character
    else if (sending cooked mode output string)
        if (UART ready)
            output the next character of string
        else if (UART ready)
            send first character of cooked mode
output string
Poll for a receive character
```

Referring now to the diagram of FIG. 2, it can be seen that the checks described above are the ones shown in the blocks 220–223 which re accessed by switch positions 230–236. My invention results in the achievement of optimization of the polling arrangement. My technique is based upon the fact that each of the operations performed upon the UARTs when the are piled in the prior art can be represented as a separate state. By reconfiguring the poling loop using a jump table the number of operations necessary on a UART based upon its state substantially reduces system overhead.

A pseudo-code description of the operation of the fist jump table 200 is as follows:

```
#                    XON/XOFF or BREAK requested, receiver
either mode.
State A 200:
            if (XON/XOFF required)
                if (UART ready)
                    transmit XON/XOFF character
            else if (BREAK requested)
                wait until all characters clear
                transmit UART
                start BREAK
                set BREAK timer
            else if (BREAK in progress)
                skip until BREAK timer times out
                stop BREAK
            if (XON/XOFF and BREAK no longer required)
                switch to state B or D or F.
            poll for a received character.
#                    Transmit RAW mode, receiver active.
State B 221:
            if (UART ready)
                send RAW output character
            poll for a received character.
#                    Transmitting COOKED mode output string.
State C 223:
            if (UART ready)
                send the next character of cooked mode
                    output string
            if (string complete)
                switch to state D
            poll for a received character.
#                    Transmit COOKED mode, receiver active.
State D 222:
            if (UART ready)
                send first character of cooked mode
                    output string
            if (string incomplete)
                switch to state C
            poll for a received character.
#                    Transmit idle, receive active.
State E 224:
            poll for a received character.
#                    Transmit active (RAW mode), receiver idle.
State F 225:
            if (UART ready)
                send RAW output character
#                    Transmit and receive idle.
State G 226:
            Processing complete.
  * -       Transitions into state A occur when the host
            requests a BREAK signal or when the receive
            routine requests an XON/XOFF character be
            transmitted.
  * -       Transitions into states B, D, or F, indicated
            by update line 300 and arrow 382, occur
            when the background routine 282 discovers
            transmit data has appeared.
  * -       Transitions into states B, D, or E, indicated
            by update line 300 and arrow 380, occur
            when the receive interrupt routine 280 detects
            incoming receive data
  * -       Transitions into states F or G, indicated
            by update line 300 and arrow 384, occur
            when no receive data has appeared within
            a timeout interval 284.
```

The reconfiguration using a first jump table 200 can be extended by implementation of a second jump table 202 to select operations based upon the existence of states 240–244 represented by paths 250–254 as illustrated in FIG. 4 when a valid character is received at box 260, thereby greatly simplifying the performance of operations by the receive routine. Note that these checks must be done once for each received character, and are not needed for those cases through the poling loop when a receive character does not appears at box 260.

```
Checks normally required each time a character is
received:
        if (LNEXT active from previous character)
                Input the character.
                Mark LNEXT inactive.
        else if (LNEXT enable and LNEXT character
        received)
                Input the character.
                Mark LNEXT active.
        else if (IXANY enabled and transmitter
        disabled)
                Re-enable transmitter.
                Input the character.
        else if (Flow control enabled and XOFF
        character received)
                Disable transmitter.
        else if (Flow control enabled and XON
        character received)
                Enable transmitter.
        else
                Input the character.
```

Utilizing my invention an the two jump tables 200, 202 illustrated in FIG. 2 and FIG. 4, the following description applies. Each of the states 240-244 can be seen to require substantially less work to perform than would be necessary if a single routine provided all of the checks to each UART. With this technique:

```
#               Previous character was LNEXT.
State A 244:
                Input, character.
                Switch to state B (indicated by update line 301
                and arrow 344).
#               Flow control with LNEXT processing.
State B 240:
                If (input character is LNEXT)
                        Input character.
                        Switch to state A (indicated by update line
                        301 and arrow 34.
                else if (input character is XOFF)
                        Disable transmitter.
                else if (input character is XON)
                        Enable transmitter.
                else
                        Input character.
#               Flow control w/0 LNEXT processing.
State C 241:
                if (input character is XOFF)
                        Disable transmitter.
                        if (IXANY enabled)
                                Switch to state D (indicated by
                                update line 301 and arrow 341.
                else if (input character is XON)
                        Enable transmitter.
                else
                        Input character.
#               Transmitter disabled and IXANY active
State D 243:
                Enable transmitter.
                Input character.
                Switch to state C (indicated by update line
                301 and arrow 343).
#               Raw mode, no flow control active
State E 242:
                Input the character
```

Figure 3:
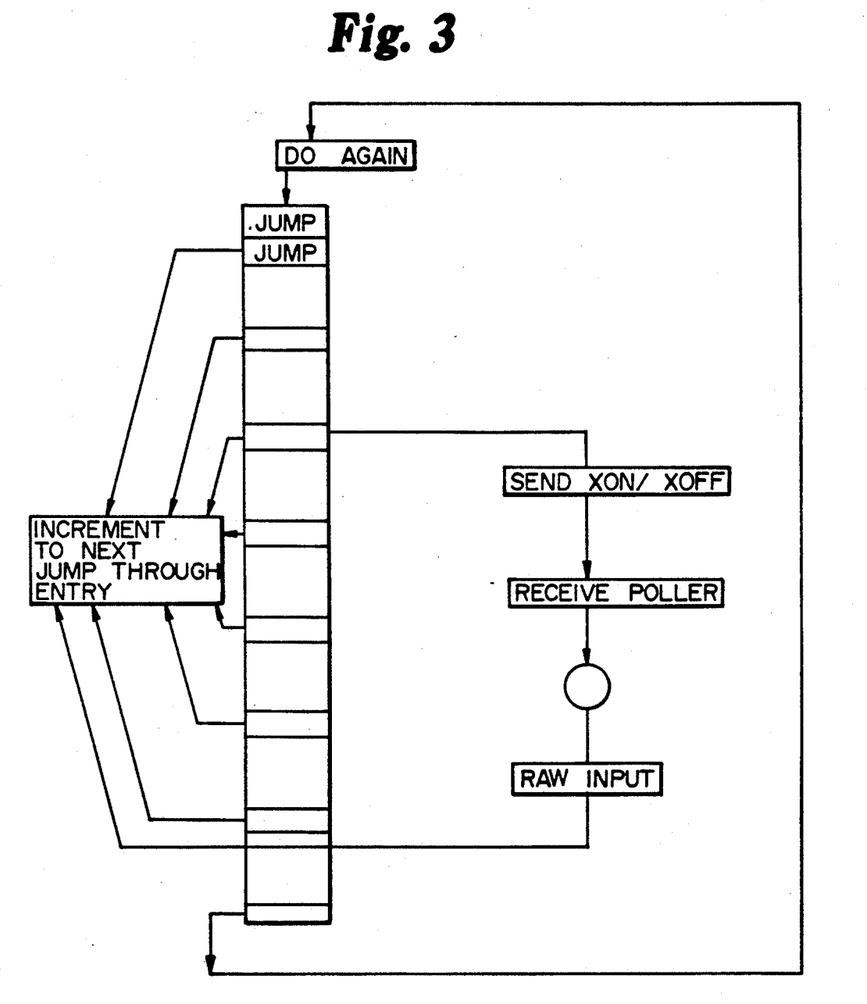
FIG. 3 is an illustration of the execution of instructions to implement the polling arrangement of the present invention.

FIG. 3 illustrates the first jump table having N+1 entries to service N UARTS. To process N UARTS, an outer loop jumps through the first entry in table to begin the first UART processing routine. Each UART processing routine referenced in the first N entries performs its assigned task, then jumps through the jump table entry following it in the table, as is also shown in FIG. 4 by continuation line 290. Hence UARTs 1-N are serviced in order. The N+1 entry, also shown in FIG. 4 at 20, is a special routine that either restarts the polling loop either immediately or after a short amount of background processing. This technique eliminates a conventional loop/counter mechanism usually necessary to exit after N UARTs have been serviced.

Although the invention has been disclosed in a communications processor having a specific set of conditions, it can be readily seen that the same invention has utility if less functions are handled as well as having utility where additional functions are present and hence additional states may be defined. The scope of my invention is not intended to be limited by the description of the preferred embodiment in this application but only by the scope of the appended claims.

What is claimed is:

1. In a system for servicing a plurality of Universal Asynchronous Receiver-Transmitters (UARTs) using a polling loop, each UART having a receive function and a transmit function and also having a dynamic servicing requirement, a method of optimizing data throughput comprising:
   a) causing the polling loop to select current UARTs in such a manner whereby each UART is eventually selected as the current UART;
   b) providing a first jump table having one entry for each UART served by the system, each entry pointing to a routine for servicing the entry's UART according its servicing requirements;
   c) executing the routines pointed to by the first jump table entry for the selected current UART; and
   d) modifying the entries in the first jump table when the dynamic servicing requirements of the UARTs change.

2. The invention of claim 1 wherein the routines executed by step c) comprise:
   i) servicing only the receive function of the current UART when the receive function is active but the transmit function is inactive; and
   ii) servicing both the transmit and receive functions of the current UART when both the receive function and the transmit function are active.

3. The invention of claim 2 wherein the routines executed by step c) further comprise:
   iii) servicing only the transmit function of the current UART when the transmit function is active but the receive function is inactive.

4. The invention claimed in claim 2 wherein the step d) further comprises:
   alternating the fist jump table entry for the current UART to point to a routine which will no longer service the transmit function after the routine executed in step c) determines that the current UART has transmitted all of the available data.

5. The invention claimed in claim 2 wherein the step d) further comprises:
   altering the first jump table entry for a particular UART to point to a routine which will service the receive function, and disabling interrupts when a receive interrupt indicates that the particular UART has begun to receive data.

6. The invention of claim 2 wherein the step d) further comprises:
   altering the first jump table entry for a particular UART to point to a routine which will service the transmit function when transit data appears for the particular UART.

7. The invention of claim 2 wherein the step e) further comprises:

altering the first jump table entry for a particular UART to point to a routine which will not service the receive function and which will enable a receive interrupt when the particular UART has the receive function active but no data is received by the particular UART within a predetermined time interval.

8. The invention of claim 1 wherein the first jump tale entries directly reference routines which service only the portion of the transmit function that is necessary to meet the servicing requirements of the UARTs.

9. The invention of claim 8 wherein one of the routines executed by the step c) comprises:
transmitting one or more characters in raw mode, and not servicing the receive function of the current UART.

10. The invention of claim 8 wherein one of the routines executed by the step c) comprises:
transmitting one or more characters in raw mode, and then servicing the receive function of the current UART.

11. The invention of claim 8 wherein one of the routines executed by the step c) comprises:
converting a character to be transmitted in cooked mode into a corresponding string of characters, transmitting a first character of the string of characters, and then servicing the receive function of the current UART.

12. The invention of claim 11 wherein one of the routines executed by the step c) comprises:
transmitting a subsequent character of the string of characters and then servicing the receive function of the current UART.

13. The invention of claim 8 wherein one of the routines executed by the step c) comprise:
transmitting flow control characters.

14. The invention of claim 2 or 8 further comprising a second jump table having entries of the UARTs which directly reference routines which service only the portion of the receive function that is necessary to meet the servicing requirements of the UARTs, wherein after receipt of a valid character by the current UART the routine reference by the entry in the second jump table is executed.

15. The invention of claim 14 wherein one of the routines referenced by the second jump table comprises receiving data without any checks for flow control characters.

16. The invention of claim 14 wherein one of the routines referenced by the second jump table comprises receiving data after checking for flow control characters.

17. The invention of claim 16 wherein one of the routines referenced by the second jump table comprises re-enabling flow control on any receive character after having previously received an XOFF flow control character.

18. The invention of claim 14 wherein one of the routines referenced by the second jump table comprises receiving data after checking for an LNEXT character and flow control characters.

19. The invention of claim 18 wherein one of the routines reference by the second jump table comprises receiving data literally after having previously received an LNEXT character.

20. The invention of claim 2 in a system with 2 or more UARTs wherein a last entry referenced in the first jump table restarts the UART polling loop.

21. The invention of claim 2 in a system with 2 or more UARTs wherein a last entry reference in the first jump table temporarily exits the UART polling loop to allow other processing.

22. The invention of claim 3 wherein the routines executed by step c) further comprise:
iv) bypassing all servicing of the current UART when the receive function and the transmit function of the current UART are inactive.

23. The invention of claim 8 wherein one of the routines executed by the step c) comprise:
controlling transmission of a BREAK signal.

* * * * *

UNITED STATES PATENT AND TRADEMARK OFFICE
CERTIFICATE OF CORRECTION

PATENT NO. : 5,210,830

DATED : May 11, 1993

INVENTOR(S) : Gene H. Olson

Page 1 of 2

It is certified that error appears in the above-identified patent and that said Letters Patent is hereby corrected as shown below:

In Col. 4, Lines 42-52 beginning with "BRIEF DESCRIPTION OF THE DRAWING" needs to be moved in Col. 3, Line 54 before "Fig. 4".

In Col. 5, Line 61 after the word "when" delete the word "the" and insert therefor --they--.

In Col. 5, Line 63 the word "poling" should be "polling".

In Col. 6, Line 4, delete "200" and insert therefor --220,--.

In Col. 6, Line 18, after "State B" insert therefor --,--.

In Col. 6, Line 22, after "State C" insert therefor --,--.

In Col. 6, Line 29, after "State D" insert therefor --,--.

In Col. 6, Line 36, after "State E" insert therefor --,--.

In Col. 6, Line 38, after "State F" insert therefor --,--.

In Col. 6, Line 42, after "State G" insert therefor --,--.

In Col. 6, Line 66, the word "poling" should be "polling".

In Col. 7, Line 21, delete the word "an" and insert therefor --and--.

In Col. 7, Line 29, after "State A" insert therefor --,--.

In Col. 7, Line 33, after "State B" insert therefor --,--.

UNITED STATES PATENT AND TRADEMARK OFFICE
CERTIFICATE OF CORRECTION

PATENT NO.   : 5,210,830
DATED        : May 11, 1993
INVENTOR(S)  : Gene H. Olson It is certified that error appears in the above-identified patent and that said Letters Patent is hereby corrected as shown below:

In Col. 7, Line 36, delete "34" and insert therefor --340)--.

In Col. 7, Line 43, after "State C" insert therefor --,--.

In Col. 7, Line 47, after "341" insert therefor --)--.

In Col. 7, Line 52, after "D" insert therefor --,--.

In Col. 7, Line 56, after "E" insert therefor --,--.

In Col. 8, Line 65, delete the word "transit" and insert therefor --transmit--.

Signed and Sealed this

Fifth Day of April, 1994

Attest:

BRUCE LEHMAN

*Attesting Officer*      *Commissioner of Patents and Trademarks*